un007675596B2

US007675596B2

(12) United States Patent
Hirota et al.

(10) Patent No.: US 7,675,596 B2
(45) Date of Patent: Mar. 9, 2010

(54) LIQUID CRYSTAL DEVICE AND INFORMATION TERMINAL DEVICE PROVIDED WITH THE SAME

(75) Inventors: Shoichi Hirota, Hitachi (JP); Osamu Itou, Hitachi (JP); Shinichiro Oka, Hitachi (JP); Masaya Adachi, Hitachi (JP); Shinichi Komura, Hitachi (JP); Hirotaka Imayama, Mobara (JP); Masateru Morimoto, Mobara (JP); Tetsuya Nagata, Hitachinaka (JP); Koichi Fukuda, Mobara (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 584 days.

(21) Appl. No.: 11/505,289

(22) Filed: Aug. 17, 2006

(65) Prior Publication Data
US 2007/0046879 A1 Mar. 1, 2007

(30) Foreign Application Priority Data
Aug. 29, 2005 (JP) ............................. 2005-247386

(51) Int. Cl.
*G02F 1/141* (2006.01)
*G02F 1/1335* (2006.01)
(52) U.S. Cl. ...................................... 349/134; 349/114
(58) Field of Classification Search ................. 349/114
See application file for complete search history.

(56) References Cited
U.S. PATENT DOCUMENTS
6,927,823 B1 * 8/2005 Reznikov et al. ............. 349/124
2005/0270449 A1 * 12/2005 Koma et al. ................. 349/114
2008/0062365 A1 * 3/2008 Maeda ........................ 349/114
2009/0033849 A1 * 2/2009 Tsuchiya ..................... 349/114

FOREIGN PATENT DOCUMENTS
JP 2000-187220 7/2000
JP 2002-072209 3/2002
* cited by examiner Primary Examiner—Michelle R Connelly Cushwa
(74) Attorney, Agent, or Firm—Antonelli, Terry, Stout & Kraus, LLP.

(57) ABSTRACT

A semi-transparent homogeneous-alignment LCD device including a transmission part and a reflection part, a first linear dielectric protrusion disposed between a common electrode and a liquid crystal layer so as to extend over a plurality of pixels in a short side direction of pixels and be disposed nearly in center of the transmission part, and a second linear dielectric protrusion disposed in the reflection part between the common electrode and a first substrate so as to extend over a plurality of pixels in the short side direction, wherein an alignment direction of liquid crystal molecules crosses the first and second linear dielectric protrusions at right angles and is parallel to a long side direction of pixels, and a tilt angle of the liquid crystal molecules is approximately 0°, or even if there is a pre-tilt angle, the tilt angle of the liquid crystal molecules is 2° or less.

15 Claims, 10 Drawing Sheets

LIQUID CRYSTAL DEVICE AND INFORMATION TERMINAL DEVICE PROVIDED WITH THE SAME

BACKGROUND OF THE INVENTION

The present invention relates to information terminal devices represented by portable telephones and LCD (liquid crystal display) devices used in them. In particular, the present invention relates to a reflection type LCD device using light incident from an observation side to display an image, and a semi-transparent type LCD device capable of using transmitted light obtained from light incident from a side opposite to an observation side and/or light incident from the observation side simultaneously or selectively to display an image.

Since the LCD devices are thin in size, light in weight and low in power consumption, they are used as display devices in a wide variety of information terminal devices such as notebook computers, personal digital assistants, portable telephones and digital cameras.

Unlike cathode-ray tubes or plasma display devices, the LCD device does not emit light itself, but displays an image or the like by controlling light quantity of light incident from the outside. Furthermore, multi-color image display becomes possible by equipping the LCD device with color filters of a plurality of colors as light control elements.

In such LCD devices, a liquid crystal layer is interposed between a pair of substrates (hereafter also referred to as "first substrate and second substrate") and an electronic latent image is converted to a visible image by controlling the molecular alignment of liquid crystal composites included in the liquid crystal layer by means of an electric field applied to the liquid crystal layer.

The LCD devices are classified into a direct matrix type and an active matrix type on the basis of the drive scheme. In the current LCD devices, the active matrix type forms a main stream because high-definition fast image display is possible.

The active-matrix type LCD device has active elements (switching elements) represented by thin film transistors' for pixel selection on the first substrate or the second substrate, and has color filters respectively having three colors for color display on either the first substrate or the second substrate.

In the reflection type LCD devices, an image is displayed by using light incident from the observation side. In the semi-transparent type LCD devices, transmitted light obtained from light incident from a side opposite to an observation side and/or light incident from the observation side can be used simultaneously or selectively to display an image.

The LCD devices are not self-light-emission type. Therefore, it is necessary to visualize an electronic latent image by illuminating it with visible light and emit resultant light to an observation face as image light. LCD devices exposed to illumination light such as natural light (external light) given from the observation face side are called reflection type. LCD devices exposed to illumination light given from the side opposite to the observation face are called transparent type. LCD devices capable of being exposed to illumination light given from the observation face side and exposed to illumination light given from the side opposite to the observation face are called semi-transparent type (semi-transparent reflection type).

As for disclosure of such a conventional technique, for example, JP-A-2000-187220 can be mentioned. As for the liquid crystal alignment used in such LCD devices, there are a homeotropic alignment scheme using a liquid crystal material having negative permittivity anisotropy and a homogeneous alignment scheme using a liquid crystal material having positive permittivity anisotropy. From the viewpoint of response time, the homogeneous alignment scheme using a liquid crystal material having positive permittivity anisotropy is more advantageous in the same way as JP-A-2000-187220.

Since the semi-transparent type LCD devices described in JP-A-2000-187220 are asymmetric in the vertical or horizontal visual field angle characteristics, however, color tone deviation occurs in the vertical or horizontal visual field angle direction in color display. As a method for solving this problem, there is a technique of dividing the alignment into a plurality of domains in a pixel and averaging visual field angle characteristics in respective domains to make the vertical or horizontal visual field angle characteristics symmetrical. As for disclosure of such a conventional technique in a transparent type LCD device that uses the homogeneous alignment scheme using a liquid crystal material having positive permittivity anisotropy and that has no reflection display function, for example, JP-A-2002-72209 can be mentioned.

SUMMARY OF THE INVENTION

An object of the present invention is to provide a semi-transparent type LCD device having homogeneous alignment that is cleared of asymmetry in the vertical or horizontal visual field angle characteristics and that implements image display with high quality.

In accordance with the present invention, an LCD device including a transmission part and a reflection part in each of pixels includes a first linear dielectric protrusion disposed between the common electrode and the liquid crystal layer so as to extend over a plurality of pixels in a short side direction of pixels, the first linear dielectric protrusion being disposed nearly in center of the transmission part, and a second linear dielectric protrusion disposed in the reflection part between the common electrode and the first substrate so as to extend over a plurality of pixels in the short side direction of pixels, wherein an alignment direction of liquid crystal molecules crosses the first and second linear dielectric protrusions at right angles, the alignment direction of the liquid crystal molecules is parallel to a long side direction of pixels, a tilt angle of the liquid crystal molecules is approximately 0 degree, or even if there is a pre-tilt angle, the tilt angle of the liquid crystal molecules is 2 degrees or less, and parallel alignment is conducted. As regards a drive voltage for driving liquid crystal at that time, a voltage higher than a threshold voltage of liquid crystal is used for image display.

The LCD device according to the present invention includes a first sheet polarizer, a first A-plate and a first negative C-plate provided between a back light used as a light source and a LCD cell generated by sticking a first substrate and a second substrate together and injecting liquid crystal between the first and second substrates, in order from the back light side, and includes a second negative C-plate, a second A-plate and a second sheet polarizer provided across the LCD cell from the back light side in order from the LCD cell side, wherein absorption axes respectively of the first sheet polarizer and the second sheet polarizer cross each other at right angles, and the first sheet polarizer and the second sheet polarizer are stuck so as to cause the absorption axes to cross the liquid crystal alignment direction of the liquid crystal layer at an angle of approximately 45 degrees, lag axes of the first A-plate and the second A-plate cross each other at right angles, and a lag axis of the first A-plate is made nearly parallel to the liquid crystal alignment of the liquid crystal layer, whereas a lag axis of the second A-plate is made to cross the liquid crystal alignment of the liquid crystal layer at approximately right angles, and a difference in retardation value between the first A-plate and the second A-plate is set nearly equal to a residual retardation value of the liquid crystal layer in the transmission part at time of black display. Furthermore, the retardation value of the first A-plate is set equal to a value in the range of approximately 110 to 130 nm, an Rth value of each of the first negative C-plate and the second negative C-plate is set equal to a value in the range of approximately 90 to 130 nm, and the retardation value of the second A-plate is set equal to a value in the range of approximately 150 to 170 nm.

In accordance with the present invention, an LCD device including a transmission part and a reflection part in each of pixels includes a level difference part provided on a boundary between the transmission part and the reflection part on the second substrate, a first linear dielectric protrusion disposed nearly in center of the transmission part on the second substrate so as to be parallel to a short side direction of pixels, and a second linear dielectric protrusion disposed between the common electrode and the liquid crystal layer so as to extend over a plurality of pixels in the short side direction of pixels, the second linear dielectric protrusion being disposed in the reflection part, wherein an alignment direction of liquid crystal molecules crosses the first and second linear dielectric protrusions at right angles, and the alignment direction of the liquid crystal molecules is parallel to a long side direction of pixels, and a tilt angle of the liquid crystal molecules is approximately 0 degree, or even if there is a pre-tilt angle, the tilt angle of the liquid crystal molecules is 2 degrees or less, and parallel alignment is conducted.

In accordance with the present invention, an LCD device including a transmission part and a reflection part in each of pixels includes a level difference part provided on a boundary between the transmission part and the reflection part on the second substrate, wherein the reflection part is disposed nearly in center of each pixel, and the transmission part is divided in two by the reflection part, a linear dielectric protrusion is disposed in the reflection part between the common electrode and the liquid crystal layer so as to extend over a plurality of pixels in the short side direction of pixels, an alignment direction of liquid crystal molecules crosses the linear dielectric protrusion at right angles, and the alignment direction of the liquid crystal molecules is parallel to a long side direction of pixels, a tilt angle of the liquid crystal molecules is approximately 0 degree, or even if there is a pre-tilt angle, the tilt angle of the liquid crystal molecules is 2 degrees or less, and parallel alignment is conducted.

In an information terminal device including an LCD device according to the present invention, it is desirable to display a white image first after power is turned on in the LCD device. In addition, it is desirable that the back light is unlit when a first image is displayed after power is turned on in the LCD device.

According to the present invention, it is possible to implement a semi-transparent LCD device having a high contrast ratio and high display efficiency in transmission display and favorable symmetry in vertical and horizontal viewing angle characteristics. Furthermore, according to the present invention, the visual recognition property of the LCD device used in information terminal devices represented by portable telephone can be enhanced.

Other objects, features and advantages of the invention will become apparent from the following description of the embodiments of the invention taken in conjunction with the accompanying drawings.

DESCRIPTION OF THE EMBODIMENTS

Hereafter, embodiments of the present invention will be described with reference to the drawings.

First Embodiment

Figure 1:
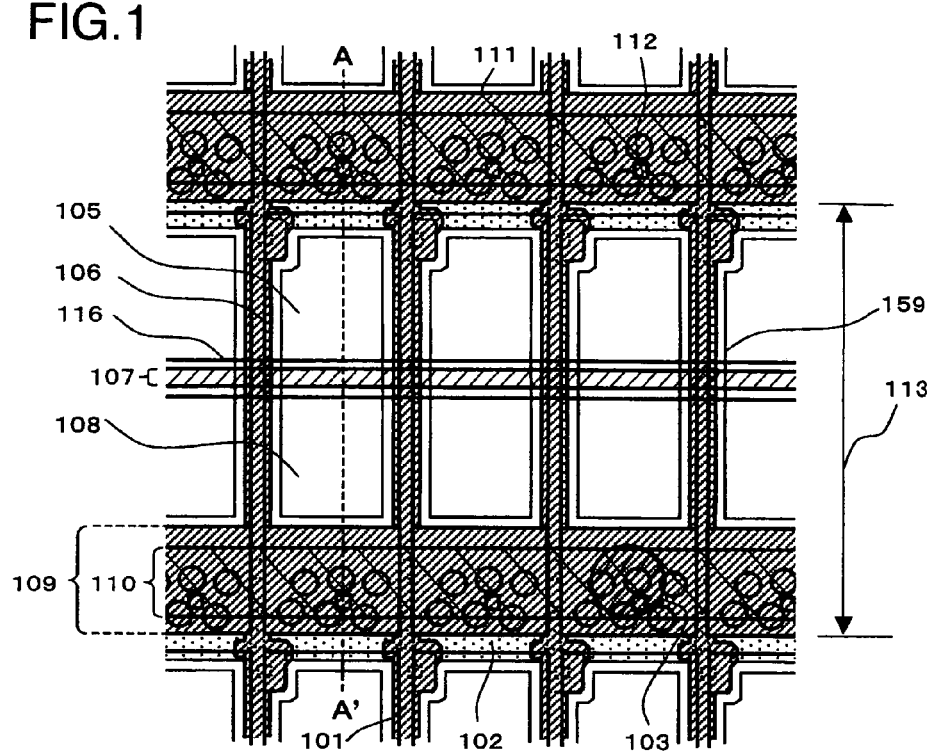
FIG. 1 is a plane view of a first embodiment.
Figure 2:
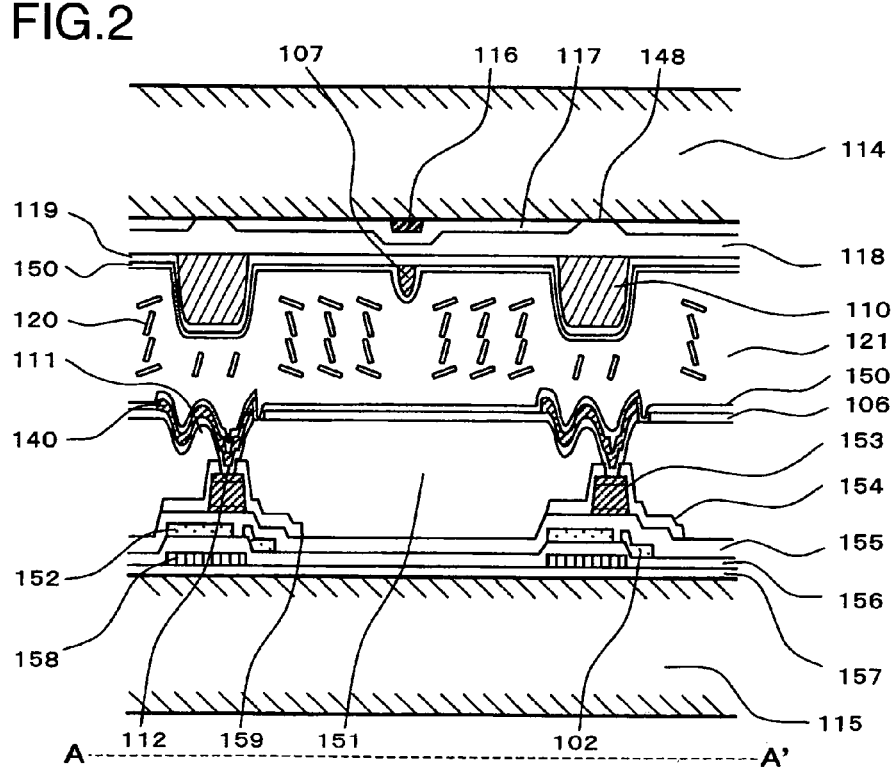
FIG. 2 is a sectional view of a first embodiment.

A configuration of an LCD device according to the present embodiment will now be described with reference to FIGS. 1 and 2. FIG. 1 is a plane view of the LCD device according to the present embodiment. In a display region including pixels arranged in a matrix form, three pixels and their surrounding regions are shown. FIG. 2 is a sectional view taken along a line A-A' in FIG. 1.

The plane view shown in FIG. 1 shows a state in which back light (not illustrated), and a second substrate 115, a liquid crystal layer 121 and a first substrate 114 shown in FIG. 2 are disposed in order in a direction away from the rear of paper and nearer to the front.

With reference to FIG. 2, a light shielding layer 116, a color filter 117, a color filter removed part 148, an overcoat film 118, a first linear dielectric protrusion 107, a second linear dielectric protrusion 110 and a common electrode 119 are formed in the first substrate 114.

Signal wiring 101, scanning wiring 102, a polycrystalline silicon layer 158, protection films 154, 155 and 157, a gate insulation film 156, a coated insulation film 151, a source electrode 153, a common electrode 152, a transparent electrode 106 and a reflection electrode 140 are formed in the second substrate 115.

An alignment control film 150 for aligning liquid crystal molecules 120 is formed on a surface of each of the first substrate 114 and the second substrate 115. The LCD device is formed by injecting the liquid crystal molecules 120 between the substrates 114 and 115 and forming the liquid crystal layer 121.

A pixel is disposed at each of intersections of the signal wiring 101 and the scanning wiring 102. Reference numeral 113 denotes a pixel pitch in the long side direction of the pixels. The pixel pitch in the short side direction of the pixels is equal to one third as long as the pixel pitch 113 in the long side direction.

For each pixel, a transmission part for transmitting and modulating illumination light emitted from the back light (not illustrated) and displaying an image, and a reflection part for reflecting and modulation external light and displaying an image are formed. The transmission part of each pixel has the transparent electrode 106. The transmission part of each pixel is divided into a first transmission part 105 and a second transmission part 108 with the first linear dielectric protrusion 107 between.

The first linear dielectric protrusion 107 is disposed on the first substrate 114 between the common electrode 119 and the liquid crystal layer 121. The first linear dielectric protrusion 107 is disposed in parallel to the scanning wiring 102 in the short side direction of the pixels so as to extend over a plurality of pixels.

Uneven structures 111 for controlling reflection-scattering characteristics for external light are formed in a reflection part 109. The reflection electrode 140 formed of a metal film including aluminum having a high reflectance as its principal ingredient is formed in each reflection part. Through-hole contacts 112 are provided in the reflection part 109, and the reflection electrode 140 and the transparent electrode 106 are connected to the underlying source electrode 153. By the way, a strut 103 is a structure for controlling the liquid crystal layer to provide it with uniform thickness.

The second linear dielectric protrusions 110 are formed on the first substrate 114 corresponding to the reflection part 109. The liquid crystal layer 121 in the reflection part 109 is controlled to become approximately half in thickness as compared with the transmission part. The second linear dielectric protrusions 110 are located on the first substrate 114 between the overcoat film 118 and the common electrode 119.

In the present embodiment, silicon oxide is used as the material of the protection layer 155, and silicon nitride is used as the material of the protection layer 154. The protection layer 154 is larger in refractive index than the protection layer 155 and the coated insulation film 151. If the protection layer 154 exists in the transmission part, therefore, a reflection loss is caused, resulting in a reduced transmittance. In the present embodiment, therefore, the protection layer 154 is removed in the transmission part. In FIGS. 1 and 2, a patterning boundary of the protection layer 154 is indicated as a patterning boundary 159 of the protection layer 154.

The liquid crystal alignment direction and tilt-up direction, the role of the linear dielectric protrusions functioning as alignment control protrusions, and the multi-domain will now be described.

The alignment direction of the liquid crystal molecules 120 is parallel to the long side direction of pixels and nearly parallel to each of the first substrate 114 and the second substrate 115. In this way, the liquid crystal molecules 120 have homogeneous alignment. It is desirable that a pre-tilt angle, which is an angle formed by liquid crystal molecules contiguous to a substrate and the substrate surface, is small as far as possible. It is more desirable that the pre-tilt angle is 0 degree, or 2 degrees or less.

In the LCD device according to the present invention, the tilt-up direction of the liquid crystal molecules is prescribed not by the direction provided with the pre-tilt angle, but by the alignment control structure using the first linear dielectric protrusion 107 and an oblique electric field generated by the second linear dielectric protrusion 110.

When one end of each of bar-like liquid crystal molecules is lifted from the horizontal state on a certain substrate, the tilt-up direction means the lifted side. If the pre-tilt angle is large, a phenomenon of tilting up in a direction opposite to the tilt-up direction prescribed by the alignment control structure occurs.

As for means for implementing the pre-tilt angle of 0 degree, the so-called optical alignment scheme, in which alignment control capability is provided by applying polarized light to an alignment control film, can be mentioned. As the optical alignment scheme, several schemes are known. As for the optical alignment scheme to be used in the present invention, however, a scheme in which anisotropy is given to the alignment control film by applying polarized light orthogonal to a desired liquid crystal alignment direction to the alignment control film is desirable.

In the structure of the LCD device according to the present invention, linear dielectric protrusions, and slopes and level difference parts such as uneven structures provided in the reflection part are present so as to be orthogonal to the liquid crystal alignment direction. If polarized light parallel to the liquid crystal alignment direction is applied to the slopes and level difference parts, the so-called p-polarized irradiation having a polarized component in the thickness direction of the alignment control film and a polarized component in the in-plane direction is conducted, and consequently there is a possibility that pre-tilt will occur in the liquid crystal alignment.

On the other hand, in the scheme in which anisotropy is given to the alignment control film by applying polarized light orthogonal to the desired liquid crystal alignment direction to the alignment control film, the so-called s-polarized light irradiation containing only a component in the in-plane direction of the alignment control film is conducted and the pre-tilt does not occur in the liquid crystal alignment in principle.

As for the optical alignment scheme applied to the LCD device according to the present invention, it is desirable to use a scheme in which anisotropy is given to the alignment control film by applying polarized light orthogonal to the desired liquid crystal alignment direction to the alignment control film. As for means for implementing an extremely low pre-tilt angle, a method of conducting rubbing processing on the alignment control film and then reducing the pre-tilt angle by ultraviolet ray irradiation can also be mentioned. Or it is also possible to mention a method of conducting the so-called parallel rubbing, i.e., conducting rubbing processing on the first substrate surface and the second substrate surface so as to make the rubbing direction the same direction when both substrates are combined. It is also possible to combine these methods.

In the state shown in FIG. 2, a certain voltage is applied to pixels and the liquid crystal molecules 120 are tilted up.

Hereafter, how to control the tilt-up direction of the liquid crystal molecules 120 in each of the first transmission part 105 and the second transmission part 108 in the configuration of the present embodiment will be described.

In FIG. 2, the first linear dielectric protrusion 107 is formed between the common electrode 119 and the liquid crystal layer 121. Liquid crystal molecules 120 on the surface of the first linear dielectric protrusion 107 are aligned along slopes of the protrusion. Liquid crystal molecules 120 on the surface of and in the vicinity of the first linear dielectric protrusion 107 are aligned in the same way as the case where a pre-tilt angle is given with respect to the first substrate 114.

A material having a permittivity nearly equal to that of the liquid crystal layer 121 is used for the first linear dielectric protrusion 107, and an electric field between the first substrate 114 and the second substrate 115 is nearly perpendicular to the substrates. As a result, the tilt-up direction of liquid crystal molecules on the surface of and in the vicinity of the first linear dielectric protrusion 107 is reversed according to whether the liquid crystal molecules are located on the left side of the first linear dielectric protrusion 107 or the right side thereof, as shown in FIG. 2. The transmission parts 105 and 108 shown in FIG. 1 are provided with a multi-domain configuration having two domain regions. The two domain regions have a boundary in the position of the first linear dielectric protrusion 107.

The second linear dielectric protrusion 110 is formed between the overcoat film 118 and the common electrode 119. At ends of the second linear dielectric protrusion 110, the electric field generated by the applied potential is distorted. As a result, an electric field in an oblique direction with respect to the normal line direction of the substrates 114 and 116 is applied to the liquid crystal layer 121. Furthermore, since directions of the oblique electric fields are opposite to each other at both ends of the second linear dielectric protrusion 110, tilt-up directions of the liquid crystal-molecules 120 are also opposite to each other.

In addition, a gap exists between adjacent pixels in the long side direction of pixels. Therefore, oblique electric fields having opposite inclinations are generated respectively between the transparent electrode 106 in the first transmission part 105 and the common electrode 119 on the first substrate 114 and between the transparent electrode 106 in the second transmission part 108 and the common electrode on the first substrate in the adjacent pixel. As a result, the tilt up direction of the liquid crystal molecules 120 in the vicinity of the second linear dielectric protrusion 110 is controlled as shown in FIG. 2.

One of advantages of the configuration according to the present invention is coexistence of the multi-domain configuration and a high aperture ratio. Electro-optic characteristics in a region having the first linear dielectric protrusion 107 behave differently from electro-optic characteristics in centers of the transmission parts 105 and 108, because of difference of the liquid crystal layer 121 in thickness from the transmission part and concentration of distortion caused by the boundary between the two domain regions. If this region is exposed when conducting black display, therefore, the black luminance rises, resulting in a lowered contrast ratio. In the LCD device in the present embodiment, therefore, light is shielded from the first linear dielectric protrusion 107 by the light shielding layer 116.

As the method for forming a multi-domain configuration by dividing pixels into two, a method of providing a linear dielectric protrusion in the long side direction of pixels is also conceivable. However, the occupation ratio of the area of the linear dielectric protrusion in the pixel becomes large, and the area occupied by the light shielding layer for light shielding light from the linear dielectric protrusion also becomes larger. If the first linear dielectric protrusion 107 is not disposed in the short side direction of pixels as in the configuration according to the present invention, but disposed in the long side direction, the aperture ratio decreases as compared with the configuration according to the present invention.

The end faces of the second linear dielectric protrusion 110 provided to control the thickness of the liquid crystal layer in the reflection part can be used for alignment control as well, by bisecting or dividing the domain region into two in the long side direction of pixels by means of the first linear dielectric protrusion 107 as in the configuration according to the present invention. This fact functions as an advantage in ensuring the aperture ratio, which is the ratio of the transmitting aperture part to the whole pixel.

Figure 3:
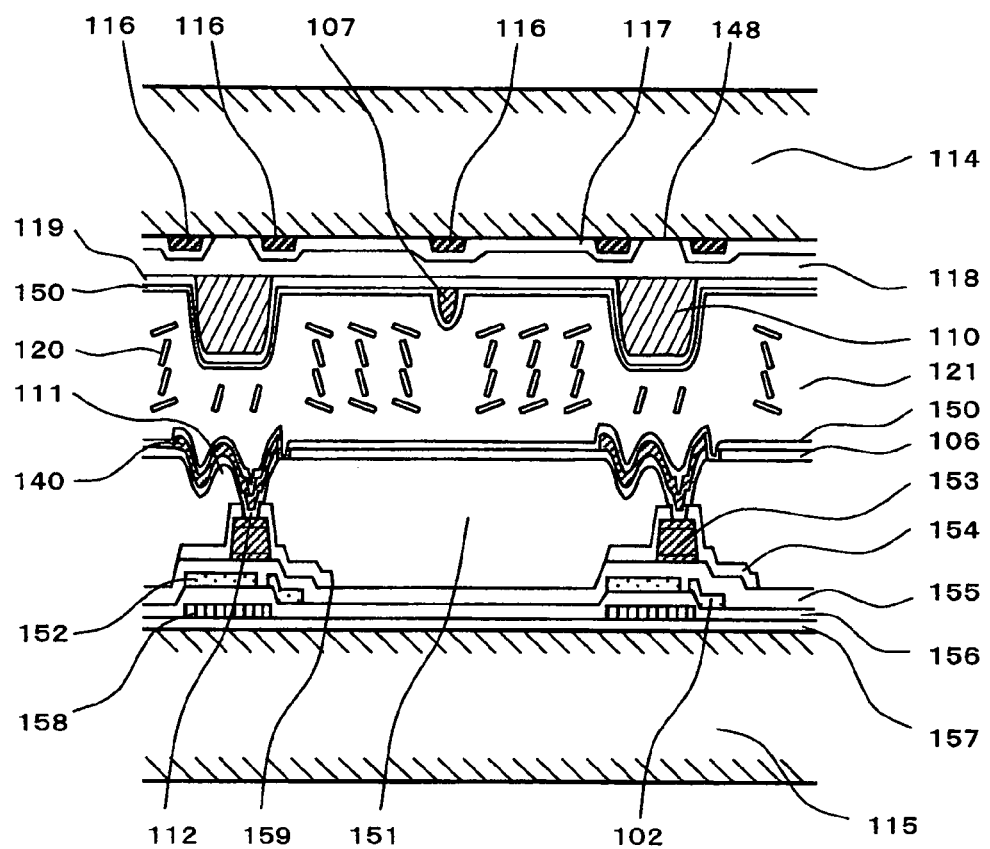
FIG. 3 is a sectional view of a modification of a first embodiment.

A configuration having a light shielding layer (BM: black matrix) on a boundary between the reflection part and the transmission part as well will now be described. FIG. 3 shows a modification of the present embodiment. FIG. 3 differs from FIG. 2 in that light shielding layers 116 are newly added in positions corresponding to ends of the second linear dielectric protrusion 110. The present configuration has two purposes.

A first purpose is to ensure the width of the second linear dielectric protrusion 110 sufficiently. If an end of the second linear dielectric protrusion 110 gets out of the reflection electrode 140 because of misalignment between the first substrate 114 and the second substrate 115, light leak from the back light occurs in the transmission part, resulting in a problem of a remarkably reduced contrast ratio. If the light shielding layers 116 are not provided in positions corresponding to the ends of the second linear dielectric protrusion 110, therefore, it is necessary to make the width of the second linear dielectric protrusion 110 sufficiently narrow as compared with the width of the reflection electrode 140 in order to prevent the second linear dielectric protrusion 110 from getting in the transmission part even if misalignment between the first substrate 114 and the second substrate 115 should occur.

In the case where the light shielding layers 116 are provided in positions corresponding to the ends of the second linear dielectric protrusion 110, therefore, light leak from the back light does not occur and lowering in contrast ratio is not caused, even if misalignment between the first substrate 114 and the second substrate 115 occurs and consequently the second linear dielectric protrusion 110 gets in the transmission part, because light is shielded from the ends of the second linear dielectric protrusion 110 by the light shielding layers 116. In design, therefore, it is also possible to make the width of the second linear dielectric protrusion 110 thicker than the width of the reflection electrode 140.

A second purpose is improvement of the reflection contrast. In the LCD device according to the present invention, the white color is displayed when the drive voltage is not applied, i.e., the so-called normally white display is conducted. In a region where the electric field is weak and the liquid crystal layer is hard to be driven, such as the region between pixels adjacent in the long side direction of pixels, therefore, a reflection bright display state is always brought about, resulting in a lowered reflection contrast ratio. Furthermore, although a region located outside the second linear dielectric protrusion 110 and on the reflection electrode 140 belongs to a reflection part, the liquid crystal layer in that region is nearly equal in thickness to the transmission part and voltage-reflectance characteristics desired as the reflection part are not exhibited, resulting in a cause of a lowered reflection contrast ratio. Therefore, it becomes possible to improve the reflection contrast ratio by light shielding light from regions located in ends of the second linear dielectric protrusion 110.

Although not illustrated in FIG. 1, it is more desirable to provide a light shielding layer for light shielding light from boundaries between pixels in the short side direction of pixels. Since light is shielded from this boundary by the signal wiring 101, transmitted light from the back light does not leak in a gap formed with the transparent electrode 106 of an adjacent pixel. However, light leak occurs as regards reflected light. Therefore, the reflection contrast ratio is improved by light shielding light from the boundary.

In the case where the configuration according to the present invention is applied, it is necessary to place restrictions on the drive voltage condition under some pixel dimensions. This will now be described with reference to FIGS. 4A-4C. By the way, the reflection part is omitted in FIGS. 4A-4C.

Figure 4A:
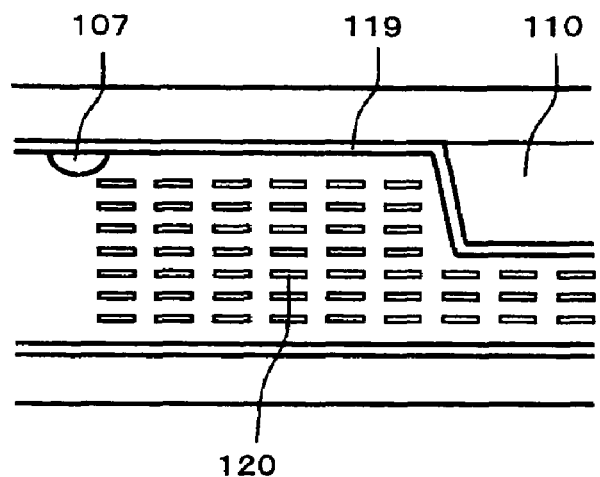
FIGS. 4A-4C are diagrams showing control in a tilt-up direction.
Figure 4B:
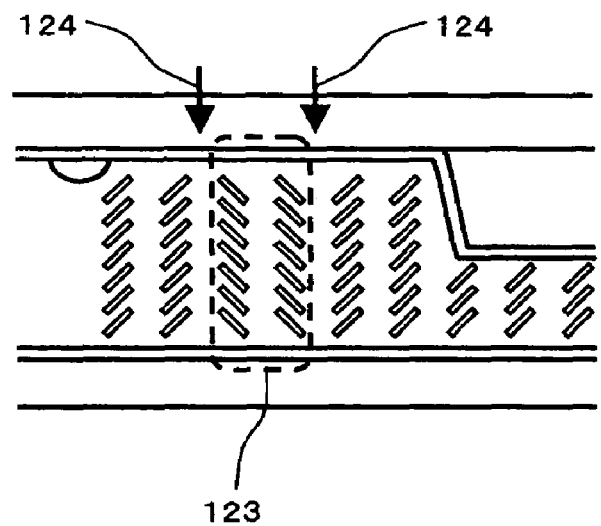
Figure 4C:
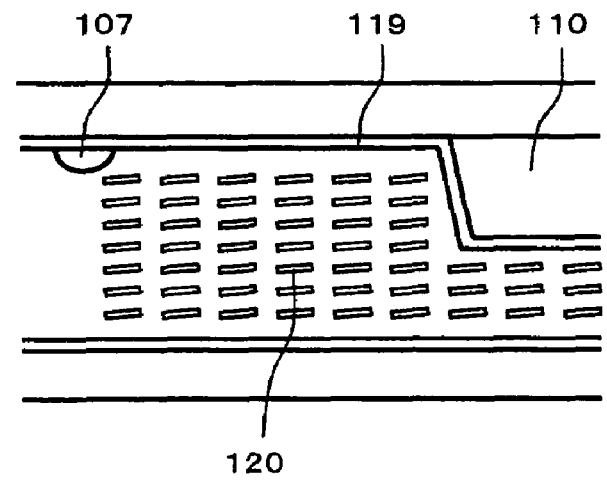

In FIGS. 4A-4C, liquid crystal molecules 120 in each of domain regions obtained by bisection are controlled in the tilt-up direction owing to the effect of the shape of the first linear dielectric protrusion 107 and the oblique electric field component generated by the second linear dielectric protrusion 110. When the distance between linear dielectric protrusions is short, it becomes possible to exert the influence of the linear dielectric protrusions upon the whole domain region. Thus, it is possible to exercise the tilt-up control on the whole domain region in a desired direction.

If the distance between linear dielectric protrusions is long as shown in FIG. 4A, it becomes difficult to exert influence of the linear dielectric protrusions upon the liquid crystal molecules 120 in the central part. For example, when the pixel voltage is changed over from 0 V to a specific voltage (for example, 4 V), the tilt-up direction of the liquid crystal molecules 120 in the central part of each domain region is determined stochastically by thermal fluctuation before the influence of the linear dielectric protrusions is exercised.

If the tilt-up direction at this time is the same as the desired tilt-up direction brought about by the influence of the linear dielectric protrusions, it is fortunate. However, the opposite case can happen (FIG. 4B). A region 123 tilted up reversely is mitigated with a time constant of several seconds, resulting in the normal tilt-up region.

Domain walls 124 are generated on boundaries between the normal tilt-up regions and the reverse tilt-up region as indicated by arrows in FIG. 4B. Since the domain wall part differs in electro-optic characteristics from the normal regions, the domain wall part is recognized visually as an abnormality of display (called domain afterimage). In order to prevent occurrence of this domain afterimage, the drive voltage for white display in the LCD device according to the present invention is set equal to a value slightly higher than the so-called threshold voltage at which liquid crystal molecules begin to be tilted up (FIG. 4C). As a result of using this drive voltage setting, the white luminance becomes slightly lower than that in the case where the drive voltage for white display is set equal to a value lower than the threshold voltage. Since the lowering is approximately 3% in ratio, there are no problems in practical use.

There is a limitation in use region in the drive voltage. When mounting the LCD device according to the present invention on a system such as a portable telephone, therefore, it is necessary to take the following sequence included in a power turn-on sequence into consideration.

After the power is turned on in the LCD device, an image displayed first is a white display image. The reason will now be described. The potential difference across the liquid crystal layer obtained immediately after the power turning on is 0 V. If an image other than the white display is displayed first, the potential difference across the liquid crystal layer changes from 0 V to a specific potential difference depending upon an image signal. If the potential difference across the liquid crystal layer changes from 0 V to a specific potential difference (for example, 4 V), a region where liquid crystal molecules are tilted up in a direction opposite to the desired direction appears as described above, and a possibility that a domain afterimage will be visually recognized is caused.

Therefore, the tilt-up direction of liquid crystal molecules in each pixel can be initialized to the desired direction by first displaying the white image after the power is turned on in the LCD device. Even if an arbitrary image is displayed thereafter, therefore, a domain afterimage does not appear. By the way, if the back light is unlit at the time of first image display after the power is turned on in the LCD device, it is inconspicuous that the white image has been displayed.

As for the method for mounting such a subsequence on a system, (1) a scheme in which it is conducted by software processing in a central processing unit for controlling the whole of a system such as a portable telephone, and (2) a configuration for automatically executing a power supply start procedure in a liquid crystal driver LSI by making it possible to variably set the voltage generation order control and time interval by means of register setting, can be mentioned.

An example of an optical film configuration required for the LCD device according to the present invention will now be described with reference to FIGS. 5 and 6.

Figure 5:
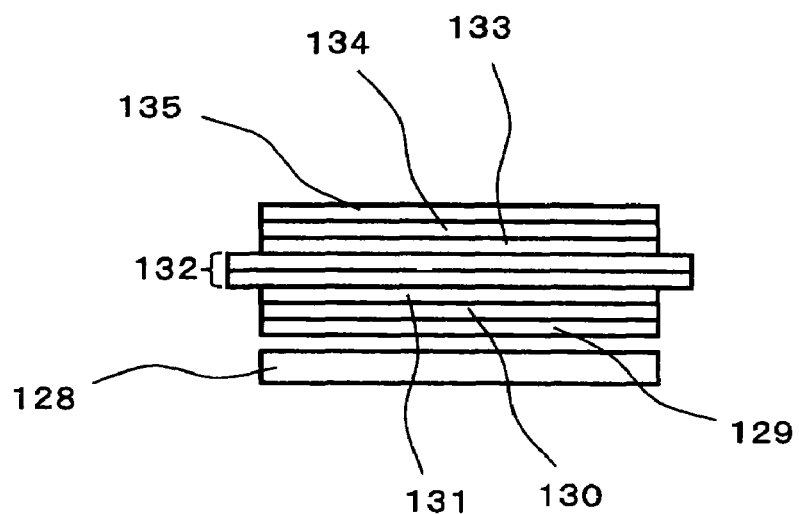
FIG. 5 is a side view of an LCD device.

As shown in FIG. 5, a back light 128 is used as a light source. An LCD cell 132 is generated by sticking a first substrate and a second substrate together and injecting liquid crystal between the first and second substrates. A first sheet polarizer 129, a first A-plate 130 and a first negative C-plate 131 are provided between the back light 128 and the LCD cell 132, in order from the back light 128 side. In addition, a second negative C-plate 133, a second A-plate 134 and a second sheet polarizer 135 are provided across the LCD cell 132 from the back light 128 side in order from the LCD cell 132 side.

Figure 6:
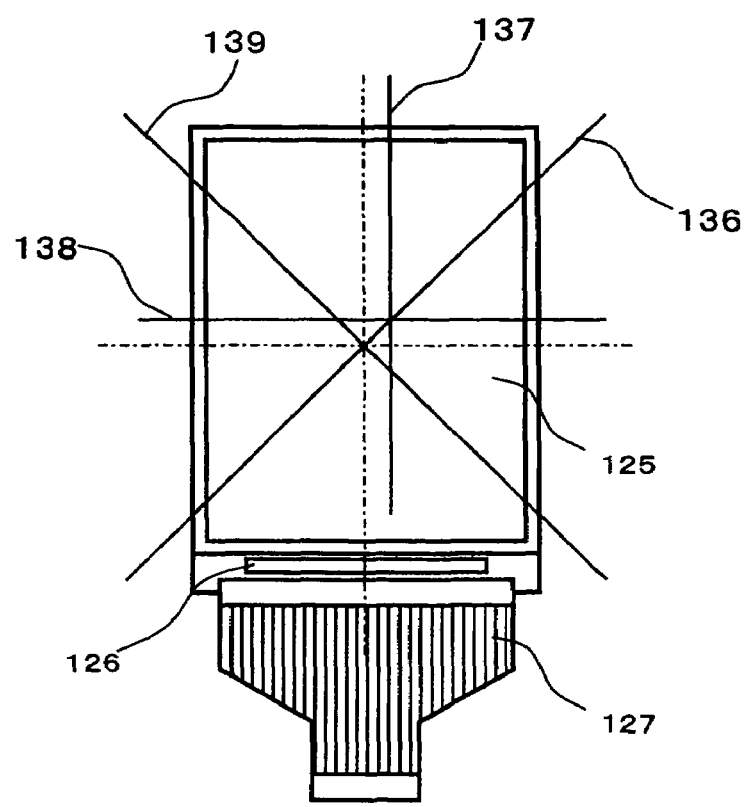
FIG. 6 is a plan view of an LCD device.

As shown in FIG. 6, a liquid crystal driver LSI 126 is disposed on the second substrate. A display part 125 is connected to a controller (not illustrated) by a flexible printed-wiring board. Absorption axes 136 and 139 respectively of the first sheet polarizer 129 and the second sheet polarizer 135 cross each other at right angles. The first sheet polarizer 129 and the second sheet polarizer 135 are stuck so as to cause the absorption axes 136 and 139 to cross the liquid crystal alignment direction (a dotted line in the vertical direction shown in FIG. 6) of the liquid crystal layer at an angle of approximately 45°.

Furthermore, lag axes of the first A-plate 130 and the second A-plate 134 cross each other at right angles. A lag axis 137 of the first A-plate 130 is made nearly parallel to the liquid crystal alignment of the liquid crystal layer. A lag axis 138 of the second A-plate 134 is made to cross the liquid crystal alignment of the liquid crystal layer at approximately right angles. A difference in retardation value between the first A-plate 130 and the second A-plate 134 is set nearly equal to a residual retardation value of the liquid crystal layer in the transmission part at the time of black display. By the way, it is more desirable that the refractive indexes in the thickness direction of the first A-plate 130 and the second A-plate 134 are made larger than smaller one of refractive indexes in the in-plane direction, because the viewing angle characteristics is improved.

The role of the first negative C-plate 131 and the second negative C-plate 133 is also to improve the viewing angle characteristics.

Typical examples of retardation values of respective optical films will now be described. The retardation value of the first A-plate 130 is set equal to 120 nm. Rth values of the first negative C-plate 131 and the second negative C-plate 133 are set equal to 110 nm. The retardation value of the second A-plate 134 is set equal to 160 nm. Rth is represented by Rth=((nx+ny)/2−nz)×d, where nx, ny and nz are refractive indexes in the in-plane directions x and y, and the thickness direction z, and d is the thickness of the film.

The residual retardation value of the liquid crystal layer at the time of black display in the transmission part is approximately 40 nm. At this time, the residual retardation value of the liquid crystal layer at the time of black display in the reflection part is 20 nm, which is approximately half of the residual retardation value in the transmission part.

The retardation value 160 nm of the second A-plate 134 is determined so as to set the difference between it and the residual retardation value 20 nm of the liquid crystal layer at the time of black display in the reflection part equal to approximately one fourth as large as the central wavelength in the visible light region. The retardation value 120 nm of the first A-plate 130 is determined by finding a difference between the retardation value 160 nm of the second A-plate 134 and the residual retardation value 40 nm of the liquid crystal layer in the transmission part. Here, central values in design have been described. However, variations in manufacture are necessarily present in the retardation values of the A-plates and in the Rth values of the negative C-plates. A deviation of ±10 nm can occur in the case of A-plates, and a deviation of ±20 nm can occur in the case of negative C-plates.

The present optical film configuration can be applied to not only the case where the liquid crystal layer has a multi-domain configuration as in the present invention but also the case where the liquid crystal layer has a mono-domain configuration.

Second Embodiment

Figures 7, 8:
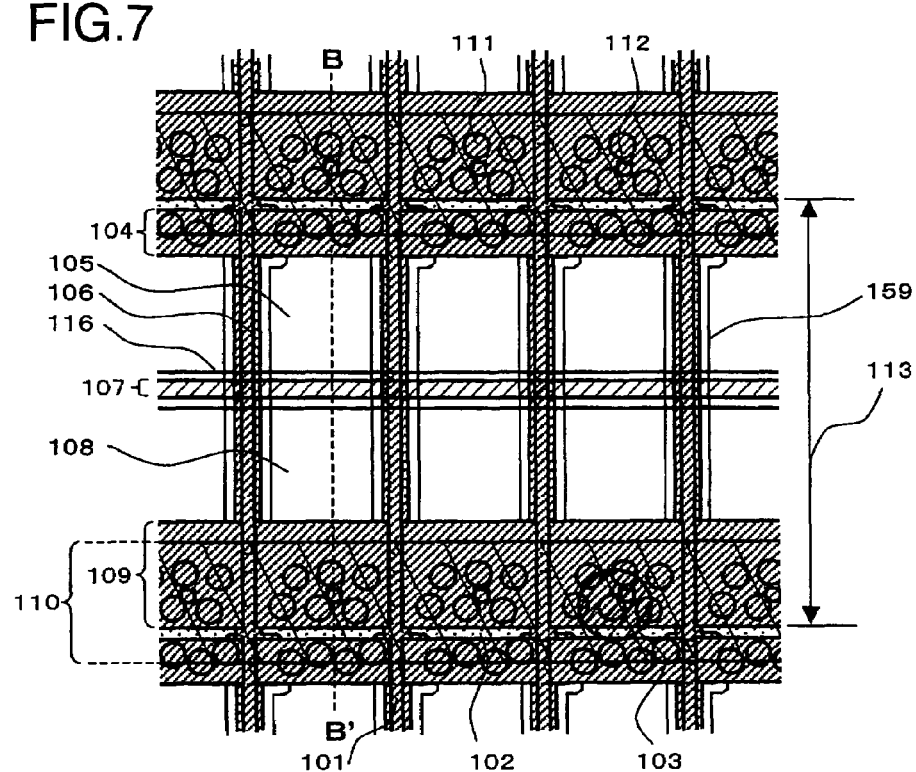
FIG. 7 is a plane view of a second embodiment.
FIG. 8 is a sectional view of a second embodiment.

A configuration of an LCD device according to the present embodiment will now be described with reference to FIGS. 7 and 8. FIG. 7 is a plane view of the LCD device according to the present embodiment. In a display region including pixels arranged in a matrix form, three pixels and their surrounding regions are shown. FIG. 8 is a sectional view taken along a line B-B' in FIG. 7.

The present embodiment differs from the first embodiment in that a second reflection part 104 is disposed across from the reflection part 109 in each pixel and the second linear dielectric protrusion 110 is disposed so as to extend over pixels adjacent in the long side direction of pixels.

In the present embodiment, the reflection part naturally has a multi-domain configuration. This will now be described. As shown in FIG. 8, tilt-up directions of the liquid crystal layer at both ends of the second linear dielectric protrusion 110 provided in the reflection part are opposite to each other. Therefore, a domain wall is generated on a boundary between these two domain regions. In the configuration of the first embodiment, a structure for fixing the position of the domain wall generated in the reflection part is not especially provided.

In the configuration of the present embodiment, therefore, the gap between pixels adjacent in the long side direction of pixels serves as a domain boundary in the reflection part and plays a role of fixing the domain wall generated in the reflection part.

In the present embodiment as well, the effects of an increased reflection contrast ratio and increased design tolerance for the width of the second linear dielectric protrusion 110 are obtained by providing light shielding layers in positions corresponding to ends of the second linear dielectric protrusion 110 in the same way as the first embodiment. Although not illustrated in FIG. 7, it is more desirable to provide a light shielding layer for light shielding light from the boundary between pixels in the short side direction of pixels. Since light is shielded from this boundary by the signal wiring 101, transmitted light from the back light does not leak in a gap formed with the transparent electrode 106 of an adjacent pixel. However, light leak occurs as regards reflected light. Therefore, the reflection contrast ratio is improved by light shielding light from the boundary.

Third Embodiment

Figure 9:
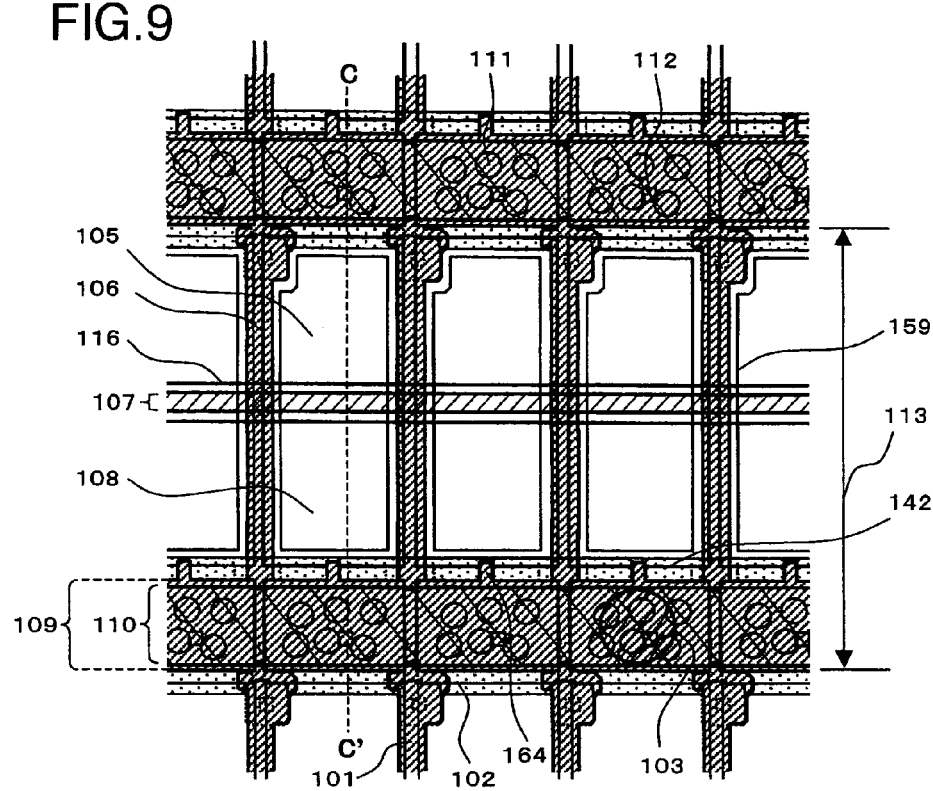
FIG. 9 is a plane view of a third embodiment.
Figure 10:
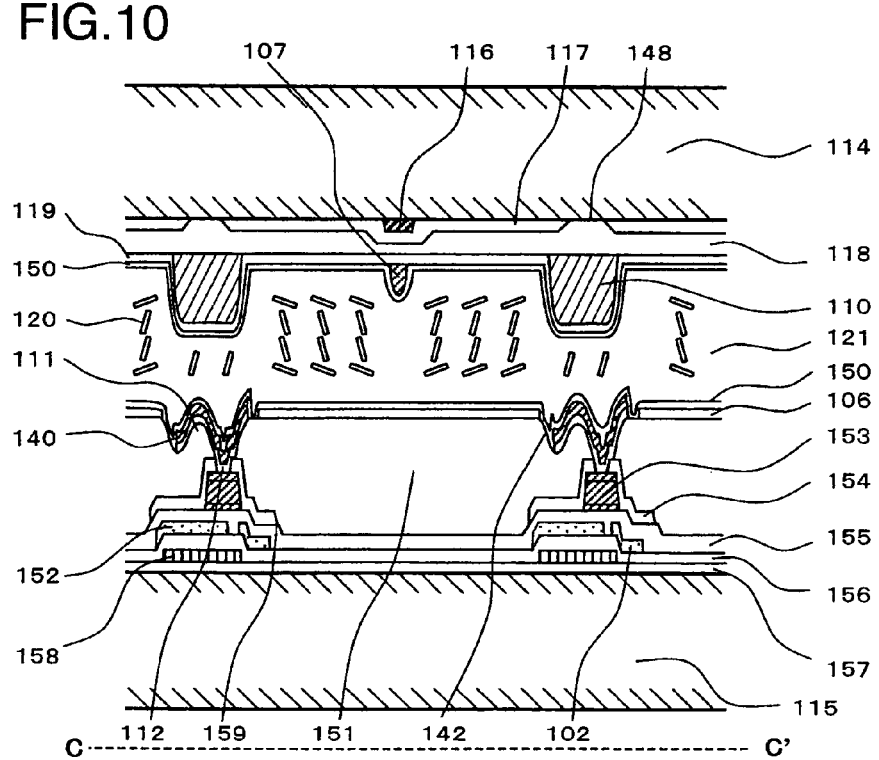
FIG. 10 is a sectional view of a third embodiment.

A configuration of an LCD device according to the present embodiment will now be described with reference to FIGS. 9 and 10. FIG. 9 is a plane view of the LCD device according to the present embodiment. In a display region including pixels arranged in a matrix form, three pixels and their surrounding regions are shown. FIG. 10 is a sectional view taken along a line C-C' in FIG. 9.

The present embodiment differs from the first embodiment in that an electrode slit 142 is provided between the reflection part and the transmission part in the transparent electrode 106 on the second substrate. Therefore, supply of a voltage to the transparent electrode 106 in the transmission part 108 is conducted via an electrode bridge 164 provided between the reflection part 109 and the transmission part 108.

High tolerance for the uneven shape in the reflection part in the present embodiment will now be described. An oblique electric field is generated between the common electrode 119 on the first substrate 114 and the transparent electrode 106 on the second substrate 115 by the electrode slit 142. This oblique electric field prescribes the tilt-up direction of liquid crystal molecules in the second transmission part 108 in the same way as the oblique electric field generated between the common electrode 119 on the second linear dielectric protrusion 110 and the transparent electrode 106.

The electrode slit 142 has a function of enhancing the alignment regulating force exerted on liquid crystal molecules in the second transmission part 108 into the tilt-up direction. The electrode slit 142 is an effective configuration for implementing the multi-domain configuration stably.

In the present embodiment as well, the effects of an increased reflection contrast ratio and increased design tolerance for the width of the second linear dielectric protrusion 110 are obtained by providing light shielding layers in positions corresponding to ends of the second linear dielectric protrusion 110 in the same way as the first embodiment. Although not illustrated in FIG. 9, it is more desirable to provide a light shielding layer for light shielding light from the boundary between pixels in the short side direction of pixels. Since light is shielded from this boundary by the signal wiring 101, transmitted light from the back light does not leak in a gap formed with the transparent electrode 106 of an adjacent pixel. However, light leak occurs as regards reflected light. Therefore, the reflection contrast ratio is improved by light shielding light from the boundary.

Fourth Embodiment

Figure 11:
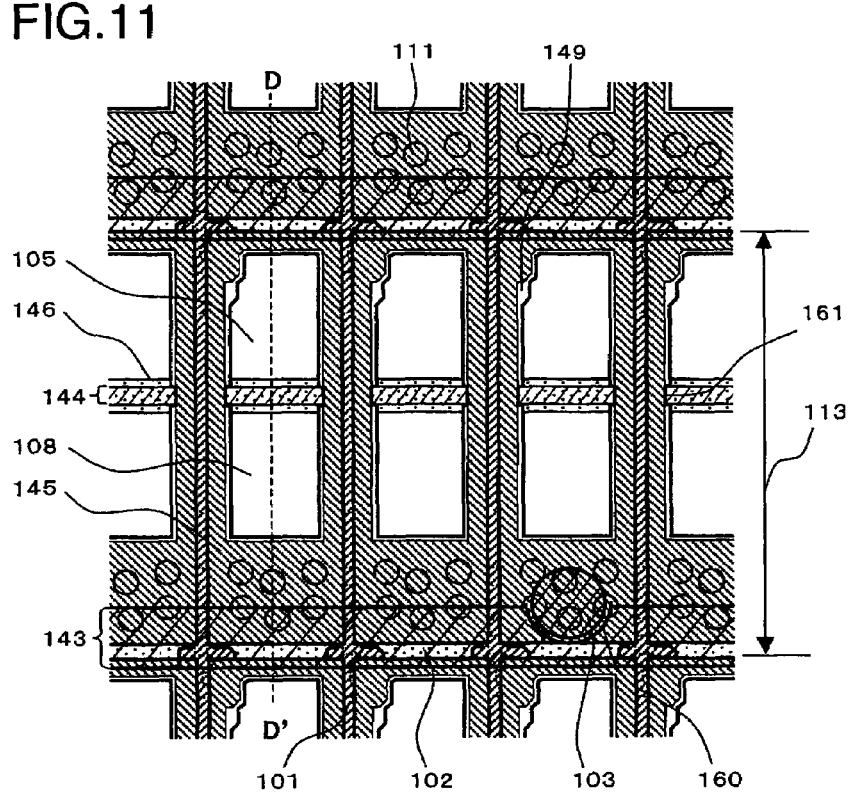
FIG. 11 is a plane view of a fourth embodiment.
Figure 12:
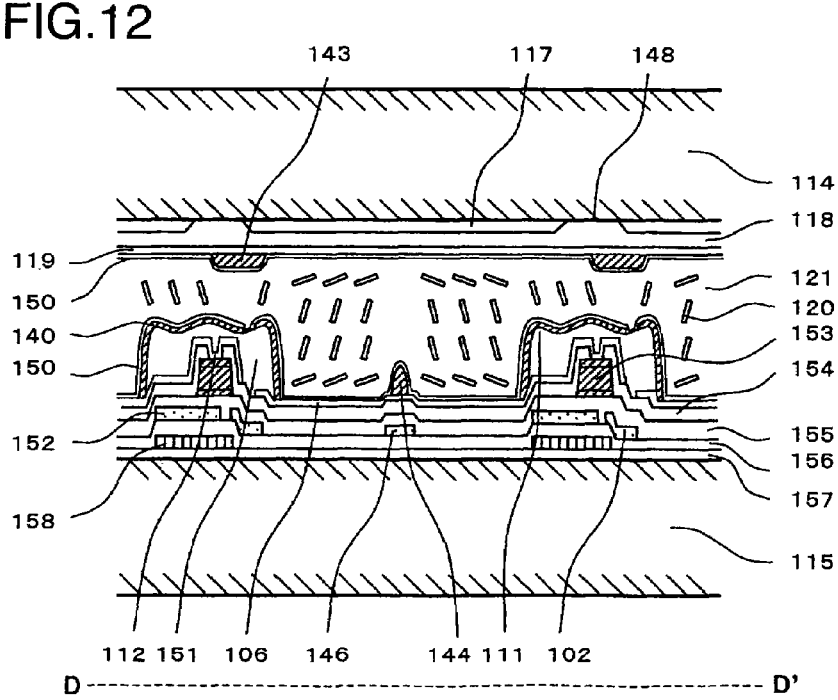
FIG. 12 is a sectional view of a fourth embodiment.

A configuration of an LCD device according to the present embodiment will now be described with reference to FIGS. 11 and 12. FIG. 11 is a plane view of the LCD device according to the present embodiment. In a display region including pixels arranged in a matrix form, three pixels and their surrounding regions are shown. FIG. 12 is a sectional view taken along a line D-D' in FIG. 11.

The present embodiment differs from the first to third embodiments in that a level difference part for exercising control so as to make the liquid crystal layer thickness in the reflection part equal to approximately half of the liquid crystal layer thickness in the transmission part is provided on the second substrate 115. Unlike the first embodiment, the level difference part between the reflection part and the transmission part is disposed on the second substrate 115. Therefore, the direction of the oblique electric filed on the boundary between the reflection part and the transmission part is opposite to that in the first embodiment. The tilt-up direction of liquid crystal molecules on the boundary between the reflection part and the transmission part also becomes opposite to that in the first embodiment. Therefore, an intra-pixel linear dielectric protrusion 144 (having the same function as that of the first linear dielectric protrusion 107) provided on the boundary between the first transmission part 105 and the second transmission part 108 is disposed on the second substrate 115.

This intra-pixel linear dielectric protrusion 144 is formed simultaneously when processing the coated insulation film 151. The coated insulation film 151 is left on the signal wiring 101 in order to make parasitic capacitance between the signal wiring 101 and the reflection electrode 140 serving as a pixel electrode small as far as possible. In the present embodiment, therefore, the intra-pixel linear dielectric protrusion 144 does not extend adjacent pixels, but it is provided independently for each pixel.

A notch 161 provided at a position where the reflection electrode 140 comes in contact with the intra-pixel linear dielectric protrusion 144 is a configuration for preventing the reflection electrode 140 from being left on the intra-pixel linear dielectric protrusion 144. If the reflection electrode 140 exists on the intra-pixel linear dielectric protrusion 144, an oblique electric field is generated. The direction of the oblique electric field in this case functions to reverse the tilt-up direction of liquid crystal molecules located around the intra-pixel linear dielectric protrusion 144. Therefore, care must be taken.

A light shielding layer for light shielding leak light caused by a domain wall generated in the position of the intra-pixel linear dielectric protrusion 144 may be formed on the first substrate 114 in the same way as the first embodiment. In the present embodiment, however, it is more desirable to provide the light shielding layer on the second substrate 115, taking the tolerance for the misalignment between the first substrate 114 and the second substrate 115 into consideration.

In the present embodiment, the light shielding layer 146 for light shielding light from the domain wall generated in the position of the intra-pixel linear dielectric protrusion 144 is formed using a metal layer used to form the scanning wiring 102. If the metal layer for forming the light shielding layer 146 is made thick unnecessarily, however, a level difference part is generated in the transmission part and the transparent electrode 106 exists on the level difference part, resulting in occurrence of an oblique electric field. The direction of the oblique electric field functions to reverse the tilt-up direction of liquid crystal molecules located around the intra-pixel linear dielectric protrusion 144. Therefore, care must be taken. It is desirable to set the thickness of the metal layer for forming the light shielding layer 146 equal to 0.2 µm or less.

The oblique electric field generated in the gap between pixels adjacent in the long side direction of pixels is opposite in direction to the oblique electric field generated on the boundary between the reflection part and the transmission part.

In the present embodiment, a linear dielectric protrusion 143 (having the same function as that of the first linear dielectric protrusion 107) is provided on the boundary between pixels adjacent in the long side direction of pixels in the reflection part 145. A strut bypassing part 160 is provided to prevent the linear dielectric protrusion 143 and the strut 103 from overlapping.

An advantage of the present embodiment is that the reflectance can be easily ensured by incorporating the space over the signal wiring 101 as well into the reflection part 145. In the present embodiment, contact between the reflection electrode 140 and the transparent electrode 106 is brought in a contact part 149 between the reflection electrode 140 and the transparent electrode 106. However, connection may be made by, for example, forming a contact hole through the coated insulation film 151 as in the first embodiment.

Fifth Embodiment

Figure 13:
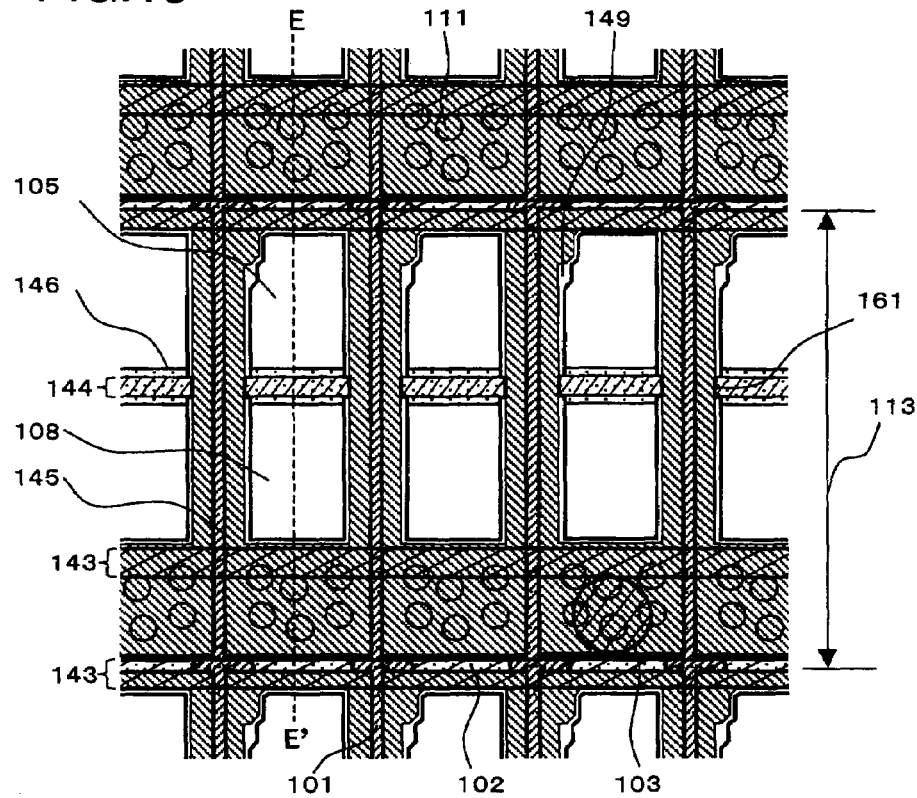
FIG. 13 is a plane view of a fifth embodiment.
Figure 14:
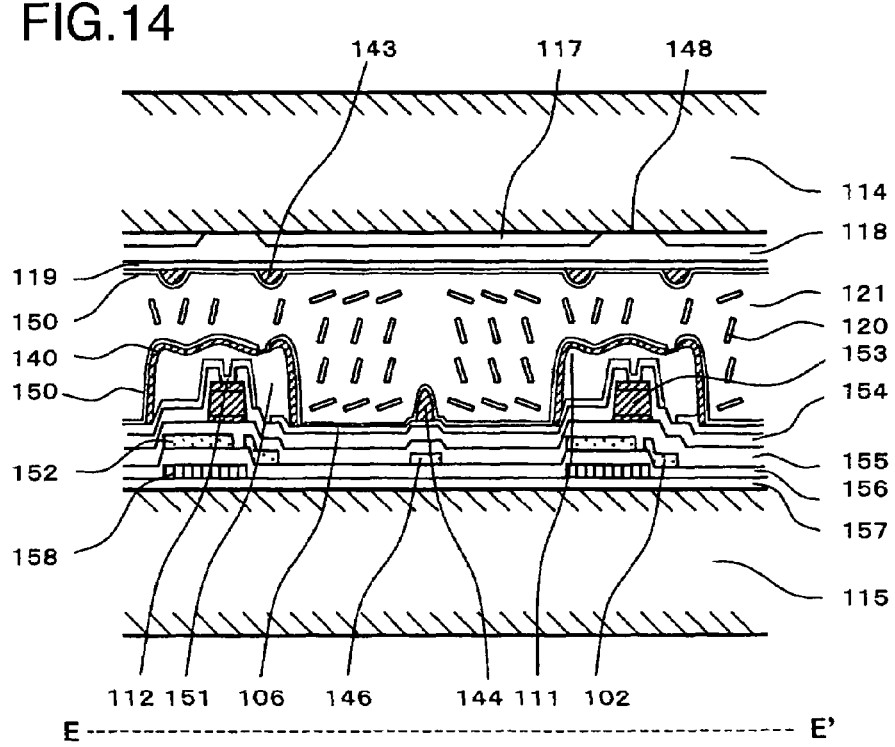
FIG. 14 is a sectional view of a fifth embodiment.

A configuration of an LCD device according to the present embodiment will now be described with reference to FIGS. 13 and 14. FIG. 13 is a plane view of the LCD device according to the present embodiment. In a display region including pixels arranged in a matrix form, approximately three pixels and their surrounding regions are shown. FIG. 14 is a sectional view taken along a line E-E' in FIG. 13.

The present embodiment differs from the fourth embodiment in that two linear dielectric protrusions 143 are provided in the reflection part 145 every pixel.

As for the oblique electric field generated in the gap between pixels adjacent in the long side direction of pixels, the tilt-up direction of liquid crystal molecules on the reflection part is prescribed by the oblique electric field generated on the boundary between the reflection part and the transmission part. However, the oblique electric field generated in the gap between pixels adjacent in the long side direction of pixels is opposite in direction to the oblique electric field generated by a level difference part on the boundary between the transmission part and the reflection part. Therefore, the linear dielectric protrusions 143 are provided on the reflection part between a region located near the transmission part and a region located near the gap between pixels to fix a domain wall generated between those regions.

In the configuration in which the intra-pixel linear dielectric protrusion 144 provided in the center of the transmission part as in the present embodiment and the fourth embodiment, a problem that the domain wall moves in the direction of the transmission part is posed unless the domain wall on the reflection part is fixed. Therefore, it is necessary to form the linear dielectric protrusions 143 on the reflection part beforehand.

Sixth Embodiment

Figure 15:
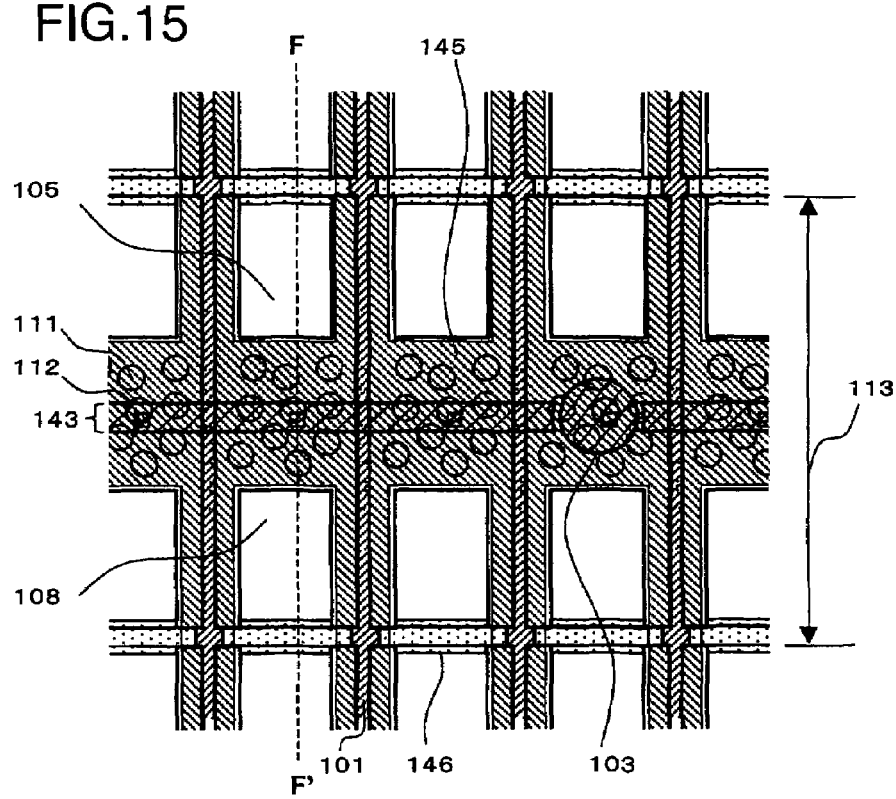
FIG. 15 is a plane view of a sixth embodiment.
Figure 16:
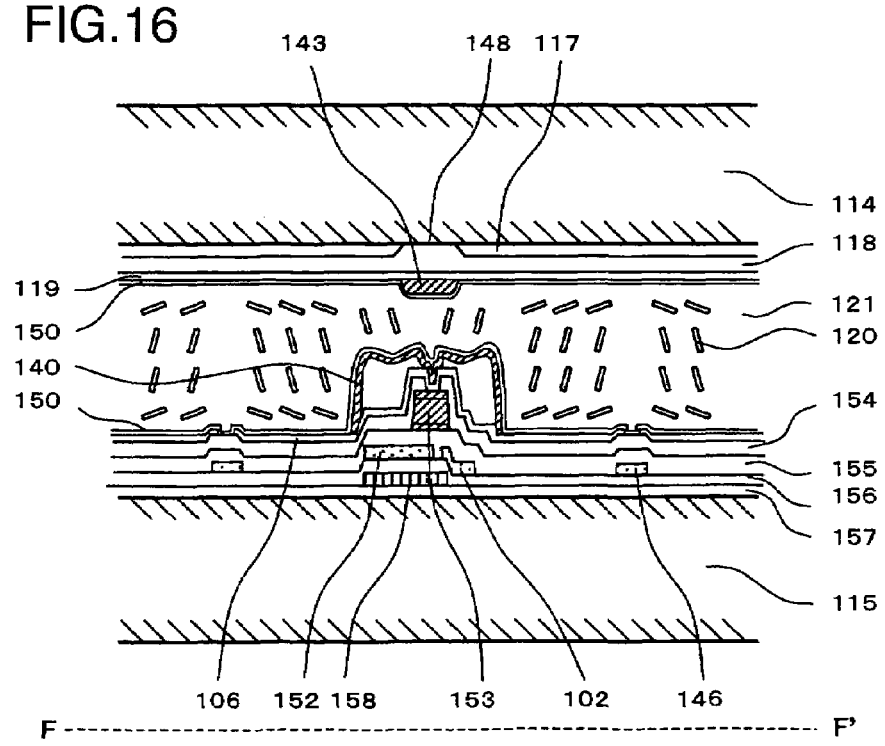
FIG. 16 is a sectional view of a sixth embodiment.

A configuration of an LCD device according to the present embodiment will now be described with reference to FIGS. 15 and 16. FIG. 15 is a plane view of the LCD device according to the present embodiment. In a display region including pixels arranged in a matrix form, three pixels and their surrounding regions are shown. FIG. 16 is a sectional view taken along a line F-F' in FIG. 15.

The configuration in the present embodiment has the following advantages as compared with the fourth embodiment and the fifth embodiment. In the configurations in the fourth embodiment and the fifth embodiment, alignment division is conducted by the linear dielectric protrusion 143 provided nearly in the center of the transmission part and the intra-pixel linear dielectric protrusion 144 provided in the reflection part. In the configuration in the present embodiment, the intra-pixel linear dielectric protrusion 144 is omitted by providing a reflection part in the center of the two transmission parts 105 and 108.

The transmission part 105 and the transmission part 108 are adjacent in the long side direction of pixels with the gap between pixels between. However, the tilt-up direction in the transmission part 105 and the tilt-up direction in the transmission part 108 are controlled to become opposite to each other by the oblique electric field generated in the gap between pixels.

The role of the linear dielectric protrusion 143 in the present embodiment is to fix the domain wall generated on the reflection part in the same way as the fifth embodiment.

Seventh Embodiment

Figure 17:
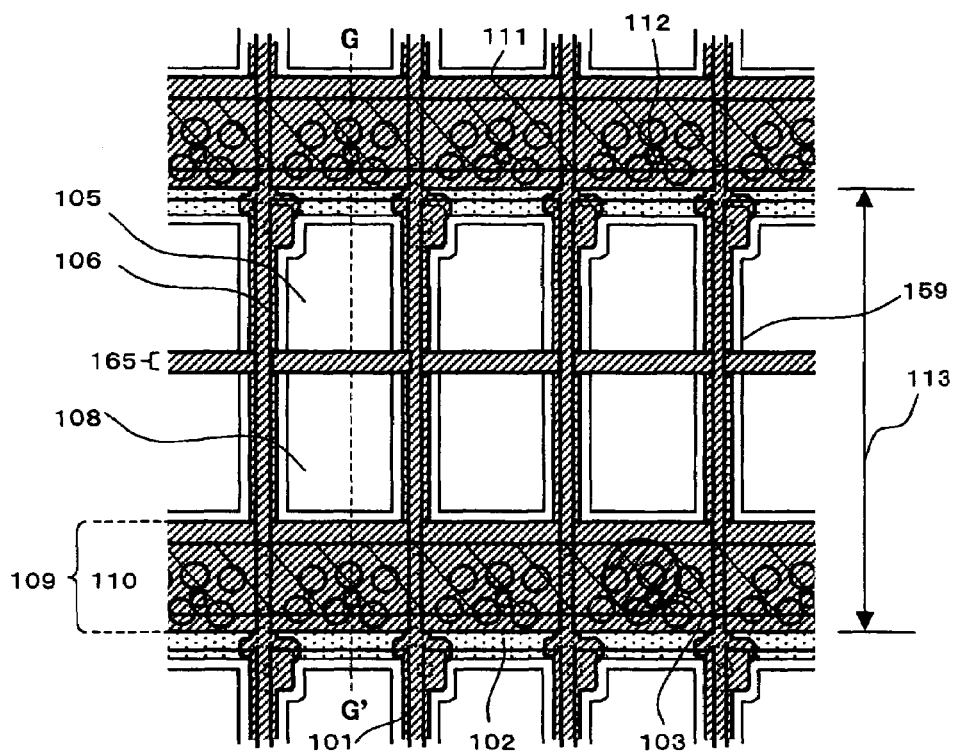
FIG. 17 is a plane view of a seventh embodiment.
Figure 18:
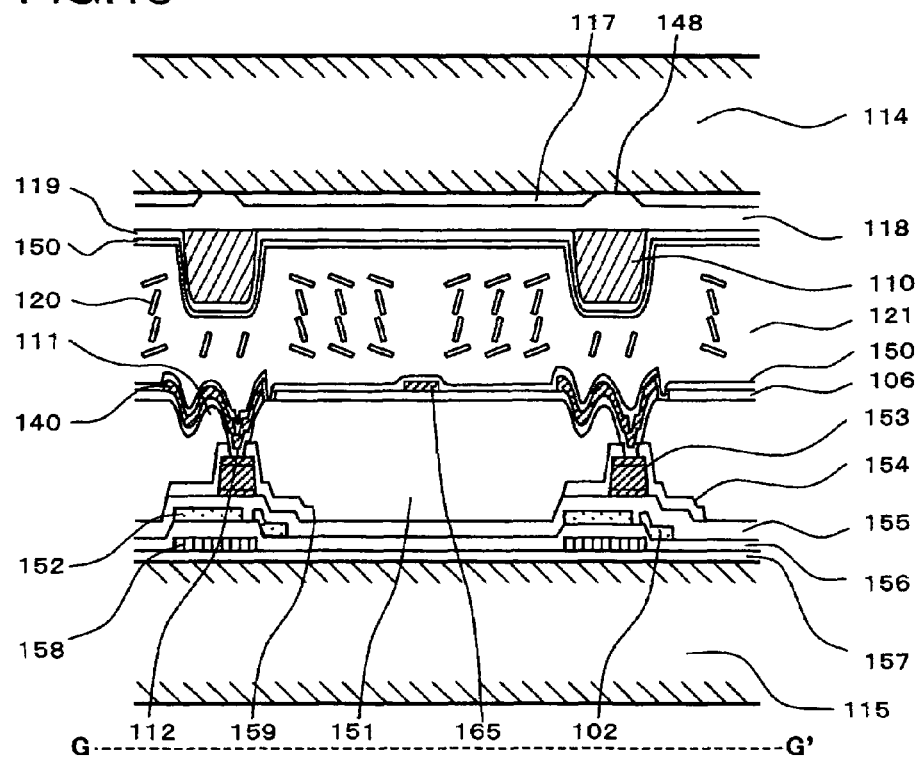
FIG. 18 is a sectional view of a seventh embodiment.

A configuration of an LCD device according to the present embodiment will now be described with reference to FIGS. 17 and 18. FIG. 17 is a plane view of the LCD device according to the present embodiment. In a display region including pixels arranged in a matrix form, three pixels and their surrounding regions are shown. FIG. 18 is a sectional view taken along a line G-G' in FIG. 17.

The configuration in the present embodiment differs from that in the first embodiment. In the first embodiment, alignment control is exercised by the first linear dielectric protrusion 107 provided on the first substrate 114. In the present embodiment, alignment control is exercised by an alignment control structure 165 provided on the second substrate 115.

As for a concrete example of the alignment control structure 16, a configuration obtained by providing the light shielding layer 146 under the transparent electrode 106 as in the fourth embodiment and the fifth embodiment and raising the underlying layer of the transparent electrode 106 may be used, besides the method of disposing the electrode in the same layer as the reflection electrode 140 on the transparent electrode 106 as shown in FIGS. 17 and 18. The tilt-up direction is controlled by the oblique electric field generated by the alignment control structure 165. It is also possible to add the alignment control structure 165 to the configuration in the first embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An LCD device including a first substrate having a common electrode, a second substrate having pixels arranged in a matrix form, and a liquid crystal layer interposed between the first substrate and the second substrate, a transmission part and a reflection part being included in each of the pixels, the LCD device comprising:
    a first linear dielectric protrusion disposed between the common electrode and the liquid crystal layer so as to extend over a plurality of pixels in a short side direction of pixels, said first linear dielectric protrusion being disposed nearly in center of the transmission part; and
    a second linear dielectric protrusion disposed in the reflection part between the common electrode and the first substrate so as to extend over a plurality of pixels in the short side direction of pixels,
    wherein an alignment direction of liquid crystal molecules crosses said first and second linear dielectric protrusions at right angles, and the alignment direction of the liquid crystal molecules is parallel to a long side direction of pixels, and
    a tilt angle of the liquid crystal molecules is approximately 0 degree, or even if there is a pre-tilt angle, the tilt angle of the liquid crystal molecules is 2 degrees or less.

2. An LCD device manufacturing method, wherein a liquid crystal aligning method for the LCD device according to claim 1 uses an optical aligning method of applying polarized light parallel to the short side direction of pixels to an alignment control film and thereby inducing an isotropy in the alignment control film.

3. An LCD device manufacturing method, wherein
    a liquid crystal aligning method for the LCD device according to claim 1 is rubbing,
    a pre-tilt angle is 2 degrees or less, and
    parallel rubbing of conducting processing so as to make a rubbing direction for the first substrate the same as that for the second substrate is executed.

4. An LCD device according to claim 1, wherein as regards a drive voltage for driving liquid crystal, a voltage region higher than a threshold voltage of liquid crystal is used for image display.

5. An LCD device according to claim 1, comprising a first sheet polarizer, a first A-plate and a first negative C-plate provided between a back light used as a light source and a LCD cell generated by sticking a first substrate and a second substrate together and injecting liquid crystal between the first and second substrates, in order from the back light side, and comprising a second negative C-plate, a second A-plate and a second sheet polarizer provided across the LCD cell from the back light side in order from the LCD cell side,
    wherein
    absorption axes respectively of the first sheet polarizer and the second sheet polarizer cross each other at right angles, and the first sheet polarizer and the second sheet polarizer are stuck so as to cause the absorption axes to cross the liquid crystal alignment direction of the liquid crystal layer at an angle of approximately 45 degrees,
    lag axes of the first A-plate and the second A-plate cross each other at right angles, and a lag axis of the first A-plate is made nearly parallel to the liquid crystal alignment of the liquid crystal layer, whereas a lag axis of the second A-plate is made to cross the liquid crystal alignment of the liquid crystal layer at approximately right angles, and
    a difference in retardation value between the first A-plate and the second A-plate is set nearly equal to a residual retardation value of the liquid crystal layer in the transmission part at time of black display.

6. An LCD device according to claim 5, wherein
    the retardation value of the first A-plate is set equal to a value in the range of approximately 110 to 130 nm,
    an Rth value of each of the first negative C-plate and the second negative C-plate is set equal to a value in the range of approximately 90 to 130 nm, and
    the retardation value of the second A-plate is set equal to a value in the range of approximately 150 to 170 nm.

7. An LCD device according to claim 1, wherein light is shielded from said first linear dielectric protrusion by a light shielding layer.

8. An LCD device according to claim 1, wherein light is shielded from said second linear dielectric protrusion so as to cause both ends or one end of said second linear dielectric protrusion in its short side direction to be covered.

9. An LCD device according to claim 1, wherein
    the reflection part is provided on both ends of a pixel in the long side direction of pixels, and
    said second linear dielectric protrusion is further disposed so as to extend over pixels adjacent in the long side direction of pixels.

10. An LCD device according to claim 1, wherein a slit is provided between the reflection part and the transmission part provided in the transparent electrode on the second substrate.

11. An information terminal device including an LCD device according to claim 1, wherein a white image is displayed first after power is turned on in the LCD device.

12. An information terminal device according to claim 11, wherein a aback light is unlit when a first image is displayed after power is turned on in the LCD device.

13. An LCD device according to claim 1, wherein said first linear dielectric protrusion is disposed in parallel to a scanning wiring which extends in the short side direction of the pixels so as to extend along the plurality of pixels.

14. An LCD device according to claim 1, further comprising an alignment control film responsive to polarized light applied in parallel to the short side direction of pixels so as to have an isotropy induced therein.

15. An LCD device according to claim 1, further comprising an alignment control film on the first substrate and the second substrate responsive to rubbing in a same direction, wherein the pre-tilt angle is 2 degrees or less.

* * * * *